United States Patent Office 3,122,577
Patented Feb. 25, 1964

3,122,577
PREPARATION OF IRON CYCLOPENTADIENIDES
Eddie G. Lindstrom and Maurice R. Barusch, Richmond,
Calif., assignors to California Research Corporation,
San Francisco, Calif., a corporation of Delaware
No Drawing. Filed July 13, 1953, Ser. No. 367,713
6 Claims. (Cl. 260—439)

The present invention relates to an improved method of preparing iron biscyclopentadienyl and derivatives thereof.

Recently, a novel compound consisting solely of iron, carbon and hydrogen has been prepared and identified as iron biscyclopentadienyl with the empirical formula $FeC_{10}H_{10}$. This compound has been prepared according to Healy and Pauson in "Nature," vol. 168, page 1039 (December 15, 1951), by a Grignard reaction of cyclopentadienylmagnesiumbromide and anhydrous ferric chloride, and according to Miller, Tebboth and Tremaine in "Journal of the Chemical Society" (February 1952), page 632, by the reaction of cyclopentadiene and reduced iron in nitrogen at 300° C.

Iron biscyclopentadienyl exists as a yellow crystalline solid with a melting point of 172.5–173° C. The compound sublimes readily without decomposition, is insoluble in water but soluble in most organic solvents. In contrast to the ordinary organometallic compounds, iron biscyclopentadienyl, which is now commonly referred to as ferrocene, possesses remarkable stability to heat, light, and oxidation, and has found practical application in numerous situations where other compounds of iron possess inherent disadvantages, for example, as an antiknock agent in gasoline compositions, a drier in coating compositions, or as a catalyst for the oxidation of asphalt.

The presently known methods of preparing iron biscyclopentadienyl, as represented by hte aforementioned references, leave much to be desired in terms of a commercial operation. According to the present invention, it has been found that iron biscyclopentadienyl and its substituted derivatives may be prepared by a liquid phase reaction of an alkali or alkaline earth metal salt of cyclopentadiene or its substituted derivatives with an anhydrous iron salt in the presence of a non-aqueous liquid reaction medium at temperatures in the range of about −80 to 200° C.

The organic reactant of the process may be described as an alklai or alkaline earth metal cyclopentadiene or an alkali or alkaline earth metal salt of an organic compound containing a cyclopentadiene nucleus which may be substituted by one or more substituent groups. In its preferred aspect, this reactant may be represented by the following structural formula:

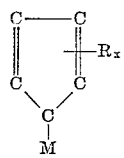

wherein M is an alkali or alkaline earth metal and preferably sodium, R is an aliphatic radial and preferably an alkyl radical, and $x$ is zero or an integer from 1 to 5. The alkali metal cyclopentadienide reactant may be prepared directly by formation of the alkali metal salt of the desired cyclopentadiene derivative possessing an acidic hydrogen in the cyclopentadiene nucleus, or cyclopentadiene itself may be reacted to form the alkali metal salt and the resulting cyclopentadienide reacted to incorporate the desired substituent groups. The iron reactant may be presented in the form of a ferric or ferrous salt of an organic or inorganic compound containing a replaceable and acidic hydrogen, provided the reactant is introduced in a substantially anhydrous form. Examples of suitable iron compounds are the halides, sulfates, nitrates, acetates, acetonylacetates, formates, propionates, etc., of which the halides, acetates and formates are preferred. Additionally, it is preferable to employ the iron salt in the ferrous form such as ferrous chloride.

Of critical importance to the conduct of the process is the presence of the non-aqueous liquid reaction medium. In general, the desired reaction will proceed in the presence of a liquid medium which is non-aqueous, substantially inert to the alkali metal cyclopentadienide reactant and possesses sufficient solvent power for the anhydrous iron salt. Representative of these liquids are the aliphatic and aromatic hydrocarbons, alcohols, ethers, amines and ammonia, etc. Mixtures of two or more solvents may also be employed. The temperature at which the reaction is conducted is not critical to the process and depends to some extent upon the choice of the liquid medium employed. As previously set forth, the process is conducted in the liquid phase so that the reaction temperatures should be maintained substantially below the boiling point of the reactants and the non-aqueous liquid medium, or pressure vessels should be employed. Additionally, low reaction temperatures are desirable to avoid excessive polymerization of the organic reactant. Generally, temperatures in the range of −80 to +100° C. will be suitable for the reaction.

In a preferred modification of this invention process, an alkali or alkaline earth metal cyclopentadienide is reacted in the liquid phase with an anhydrous iron salt in the presence of liquid ammonia or an N-organic base having an acid dissociation constant, as measured in an aqueous system, less than $1 \times 10^{-16}$. These non-aqueous liquid reaction media may generally include, besides the preferred liquid ammonia, compounds or mixtures thereof falling in the classes of the primary, secondary and tertiary aliphatic amines, primary and secondary aryl amines, primary, secondary and tertiary alkanol amines, and N-heterocyclic compounds. Within the foregoing classes of N-organic bases, selection of the desired liquid reaction medium is dependent upon a number of specifications with respect to their physical and chemical characteristics. Thus, by definition, the N-organic base should be liquid at the temperature and pressure at which the reaction is conducted and preferably liquid at temperatures below about 30° C. Additionally, the N-organic base should be substantially inert with respect to the alkali or alkaline earth metal cyclopentadienide reactant to prevent loss of the reactant and formation of by-products. Further, an appreciable solvating power for the anhydrous iron salt is desirable and it is preferred to select an N-organic base which is capable of forming comparatively labile coordination compounds or complexes with the iron salt.

The preparation of the alkali or alkaline earth metal cyclopentadienide reactant may also be conducted in the presence of the preferred liquid reaction media and thereby facilitate the materials' handling and minimize the reaction variables in the process. Thus, cyclopentadiene, its aliphatic substituted derivatives or compounds containing a cyclopentadiene nucleus with an acidic hydrogen may be reacted directly with an ionic solution of the desired alkali or alkaline earth metal in liquid ammonia or a liquid N-organic base. Additionally, instead of the elemental metal, compounds of the desired alkali or alkaline earth metal with a weak acid-reacting compound may be used in solution with liquid ammonia or the liquid N-organic base reaction medium. Illustrative of such compounds are the alkali metal carbohydrides such as the alkyls, aryls, acetylides, etc., the metal alcoholates and the amides. Particularly preferred as the basic reactants are the alkali metal amides and especially sodium amide employed in the presence of liquid ammonia.

The final iron cyclopentadienides may be recovered from the reaction system by a number of conventional methods depending upon the physical characteristics of the product. The solid products, such as iron biscyclopentadienyl, may be sublimed from the reaction mix after removal of the reaction medium and the liquid products, such as the higher aliphatic derivatives, may be purified and recovered by distillation. Solvent extraction may also be employed or the metathesis reaction process may be conducted in the presence of a product solvent which is immiscible with the liquid reaction medium. Examples of the latter may be the hydrocarbon solvents, such as mixed hexanes or toluene, employed in a liquid ammonia system.

The following examples are presented by way of illustrating the unique aspects of the subject reaction process and are not to be construed as limitations thereof.

*Example 1*

In a 500-ml. flask equipped for introduction of reactants, temperature measurements, motor stirring, and condensing and/or venting reaction gases, and cooled with a solid carbon dioxide-acetone coolant, 300 ml. of liquid ammonia were condensed. 0.2 gram of powdered $Fe(NO_3)_3 \cdot 9H_2O$ was then added to the flask followed by the addition of 1 gram of sodium to secure reduction of the iron salt to finely divided metallic iron catalyst. To the resulting mixture of ammonia and catalyst, 23 grams of clean sodium in the form of pellets was added at a sufficiently slow rate to avoid exceeding the capacity of the condenser, resulting in the formation of 1 gram mol of sodium amide. To this mixture of sodium amide in the presence of excess ammonia, 66 grams of freshly-distilled cyclopentadiene monomer were then added dropwise, again at a rate not exceeding the condenser capacity. The resultant formation of sodium cyclopentadienyl was obtained by heat evolution and by change of color in the original gray amide slurry to green.

In a separate operation, 100 grams of $FeCl_2 \cdot 4H_2O$ (0.5 mol) were dehydrated by heating under vacuum (5 mm. absolute) to about 160° C. for a sufficient time to disengage the theoretical quantity of water. The resulting anhydrous ferrous chloride was then added to the slurry of sodium cyclopentadienyl in liquid ammonia over a period of about 10 minutes and stirring was continued for 2 hours at the boiling point of the solution. The carbon dioxide-acetone coolant was then removed from the condenser, and the liquid ammonia allowed to evaporate overnight. 100 ml. of absolute alcohol was added to the residue, followed by 200 ml. of water and 150 ml. of concentrated hydrochloric acid. After stirring for about 2 hours, the crude product was filtered off and water washed. The filtrate and washings were colored blue. The crude product was then dissolved in carbon tetrachloride and filtered free of by-product residue. The carbon tetrachloride was evaporated off the filtrate and the product dried by heating in a water bath at 50° C. under 5 mm. absolute pressure. 48 grams of small orange crystals were obtained equivalent to a yield of 51.5 mol percent. The original blue filtrate was reduced with stannous chloride, yielding a flocculent canary yellow precipitate. The latter was filtered, washed with water, and dried by heating at 60° C. under 5 mm. pressure, bringing the total yield to 65 mol percent.

The iron biscyclopentadienyl recovered was analyzed as follows:

|  | Theoretical | Found |
|---|---|---|
| Weight Percent: |  |  |
| Iron | 30.03 | 29.76, 29.64 |
| Carbon | 64.57 | 64.75, 64.75 |
| Hydrogen | 5.42 | 5.31, 5.47 |

*Example 2*

An ammonia solution of sodium cyclopentadienyl was prepared as in Example 1. The solution was treated with the stoichiometric amount of anhydrous ferrous sulfate. After treatment of the ammonia-free residue by substantially the same method employed in Example 1, a yield of about 15 mol percent of iron biscyclopentadienyl was obtained.

*Example 3*

As an alternate method of producing sodium cyclopentadienyl, an ionic solution of elemental sodium in liquid ammonia was employed as the alkali metal reactant. 4.6 grams of clean sodium were dissolved in 200 ml. of liquid ammonia giving a deep blue solution. Cyclopentadiene monomer was added dropwise while cooling the reaction mix with a solid carbon dioxide-acetone coolant. There was considerable heat reaction, but no hydrogen evolution, and after about a 50 percent excess over the stoichiometric amount of cyclopentadiene had been added, the cooled reaction mix changed to water white. It was apparent that loss of some cyclopentadiene by reduction with hydrogen had occurred.

*Example 4*

Employing the method of Example 1, 0.2 gram mol of sodium cyclopentadienyl was prepared in solution in 150 ml. of liquid ammonia. 24.6 grams (0.2 gram mol) of normal propyl bromide was then added dropwise to the sodium cyclopentadienyl solution, and stirring was continued for 1 hour. The propyl bromide addition was accompanied by evolution of considerable heat, and the precipitation of sodium bromide indicated the formation of n-propyl cyclopentadiene.

In a second flask, 0.2 gram mol of sodium amide was prepared as in Example 1, and the resulting cooled slurry of sodium amide in 150 ml. of liquid ammonia was added to the cooled ammonia solution of n-propylcyclopentadiene, resulting in the formation of sodium n-propylcyclopentadienyl. Proceeding again according to the method of Example 1, this solution was reacted with 0.1 gram mol of anhydrous ferrous chloride and the ammonia removed by evaporation after the reaction was complete. The product was extracted from the crude reaction mix with petroleum-mixed hexanes. Upon removal of the solvent, 23.1 grams of a dark amber liquid crude product were obtained. This material was distilled under vacuum (5 mm. absolute pressure). A top cut was taken consisting of 9.6 grams of a yellow liquid boiling over the range of 103 and 127° C., but with the bulk recovered between 115 and 125° C.

The resulting iron bis-n-propylcyclopentadienyl gave the following inspections:

|  | Found | Theoretical |
|---|---|---|
| Molecular Weight (Freezing Point in Benzene) | 257 | 270 |
| Weight Percent Iron | 20.2, 20.3 | 20.7 |

*Example 5*

A mixture of cyclopentadiene and methylcyclopentadiene monomers was separated from their dimers and other unsaturates of similar boiling range obtained from a petroleum origin by thermal depolymerization. This was accomplished by heating the diolefin mixture at 160–180° C. and removing the monomers through a Friedrichs condenser maintained at 75–85° C. The diene monomers were then separated by fractional distillation at reduced pressure. The methylcyclopentadiene fraction was collected at 22–24° C. and 100 mm. pressure. 0.25 gram mol of sodium amide was prepared in 300 ml. of liquid ammonia, and 20 grams of methylcyclopentadiene (0.25 gram mol) were added dropwise over a period of 10 minutes while cooling the mixture in a solid carbon dioxide-acetone bath. The reaction mixture was allowed to warm to the boiling point and stirred for 15 minutes. 16 grams of anhydrous ferrous chloride were then added to the ammonia solution of sodium methylcyclopentadienyl while cooling with a solid carbon dioxide-acetone coolant. The resulting slurry was stirred for ½ hour in the cooling bath and then for 2 hours at its boiling point. The ammonia was allowed to evaporate overnight.

The resulting iron bismethylcyclopentadienyl was recovered from the reaction products by four extractions with petroleum-mixed hexanes. The solvent was removed from the filtrate at 5 mm. pressure, and 33.5 grams of a low viscosity liquid product were obtained. This product was distilled in a 20-plate microcolumn at 20:1 reflux ratio. 14.7 ml. of product distilling between 95 and 103° C. at 10 mm. pressure was obtained which was substantially pure iron bismethylcyclopentadienyl with a yield of approximately 55 percent. The 6.4 grams of distillate obtained between 99 and 102° C. solidified.

After two recrystallizations from an iso-octane solvent in which the product was quite soluble, the golden orange platelets melted sharply at 39.1 to 39.3° C. Additional crystalline iron bismethylcyclopentadienyl was obtained from the liquid distillate by cooling a concentrated solution in iso-octane solvent to solid carbon dioxide temperatures. The product had a pleasant camphor-like odor.

The inspections on the resulting iron bismethylcyclopentadienyl are as follows:

|  | Found | Theoretical |
|---|---|---|
| Molecular Weight (Freezing point in Benzene) | 210 | 214.1 |
| Weight Percent: | | |
| Carbon | 67.04, 67.11 | 67.32 |
| Hydrogen | 6.69, 6.72 | 6.59 |
| Iron | 26.03 | 26.09 |

*Example 6*

11.5 grams of metallic sodium were finely divided and converted to so-called sodium "sand" by shaking in hot xylene. The sodium "sand" was extracted and rinsed with ether and covered with 350 ml. of anhydrous ethyl ether. 33 grams of cyclopentadiene monomer were then added to the sodium-ether mix with stirring in a flask provided with a condenser cooled by solid carbon dioxide-acetone, resulting in the formation of sodium cyclopentadienyl slurried in ether.

In a separate flask, 32 grams of anhydrous ferrous chloride were added to 400 ml. of pyridine. The ferrous chloride-pyridine slurry was then added to the slurry of sodium cyclopentadienyl in ether and stirring continued for a few minutes. Thereafter, 65 ml. of 2 N HCl were added and the mixture filtered. The filtrate upon dilution by pouring into water produced a copious precipitate which was filtered off, air dried, and recrystallized from an iso-octane solvent. 33 grams of iron biscyclopentadienyl were recovered corresponding to a yield of 71 mol percent.

Obviously, many modifications and variations of the invention, as hereinbefore set forth, may be made without departing from the spirit and scope thereof, and therefore only such limitations should be imposed as are indicated in the appended claims.

We claim:
1. A process for the production of an iron biscyclopentadienyl which comprises reacting an alkali metal cyclopentadienyl with an anhydrous iron salt in the presence of a non-aqueous liquid reaction medium selected from the group consisting of ammonia and an N-organic base having an acid dissociation constant less than $1 \times 10^{-16}$.

2. A process for the production of an iron biscyclopentadienyl which comprises reacting in the liquid phase an alkali metal cyclopentadienyl with anhydrous iron salt in the presence of a non-aqueous liquid reaction medium selected from the group consisting of ammonia and an N-organic base having an acid dissociation constant less than $1 \times 10^{-16}$ at temperatures in the range of about $-80$ to $+200°$ C.

3. A process for the production of an iron biscyclopentadienyl which comprises reacting an alkali metal cyclopentadienyl with an anhydrous ferrous salt in the presence of a non-aqueous liquid reaction medium selected from the group consisting of ammonia and an N-organic base having an acid dissociation constant less than $1 \times 10^{-16}$.

4. A process for the preparation of an iron cyclopentadienide which comprises the liquid phase reaction of a compound of the following structural formula:

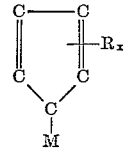

in which M is an alkali metal, R is a lower alkyl radical, and $x$ is selected from the group consisting of zero and integers from 1 to 5, with an anhydrous iron salt in the presence of a non-aqueous liquid reaction medium selected from the group consisting of ammonia and an N-organic base having an acid dissociation constant, as measured in an aqueous system, less than $1 \times 10^{-16}$.

5. A process for the preparation of an iron biscyclopentadienyl which comprises the liquid phase reaction of alkali metal cyclopentadienyl with an anhydrous inorganic ferrous salt in the presence of liquid ammonia.

6. A process for the preparation of an iron biscyclopentadienyl which comprises reacting an organic compound selected from the group consisting of cyclopentadiene and lower alkyl substituted derivatives thereof with an alkali metal amide in the presence of liquid ammonia and thereafter contacting in the liquid phase and in the presence of liquid ammonia the resulting alkali metal cyclopentadienide with an anhydrous iron salt.

References Cited in the file of this patent
UNITED STATES PATENTS

| 2,680,756 | Pauson | June 8, 1954 |
| 2,777,887 | Weinmayr | Jan. 15, 1957 |
| 2,834,796 | Barusch et al. | May 13, 1958 |

OTHER REFERENCES

Fischer et al.: Zeitschrift für Naturforschung, vol. 8B, part 5, May 1953, pp. 217–219.